United States Patent
Kim et al.

(10) Patent No.: US 9,813,525 B2
(45) Date of Patent: Nov. 7, 2017

(54) IN-VEHICLE APPARATUS FOR SIGNAL CONVERSION BETWEEN ETHERNET AND CAN COMMUNICATION AND CONTROL METHOD THEREOF

(71) Applicant: Hyundai Motor Company, Seoul (KR)

(72) Inventors: Dong Ok Kim, Gyeonggi-Do (KR); Sang Woo Yu, Seoul (KR)

(73) Assignee: Hyundai Motor Company, Seoul (KR)

( * ) Notice: Subject to any disclaimer, the term of this patent is extended or adjusted under 35 U.S.C. 154(b) by 165 days.

(21) Appl. No.: 14/524,425

(22) Filed: Oct. 27, 2014

(65) Prior Publication Data

US 2015/0229741 A1 Aug. 13, 2015

(30) Foreign Application Priority Data

Feb. 13, 2014 (KR) ........................ 10-2014-0016523

(51) Int. Cl.
*H04L 29/06* (2006.01)
*H04L 12/46* (2006.01)
*H04L 29/08* (2006.01)
*H04L 12/40* (2006.01)

(52) U.S. Cl.
CPC ........ *H04L 69/08* (2013.01); *H04L 12/40169* (2013.01); *H04L 12/4625* (2013.01); *H04L 12/4633* (2013.01); *H04L 67/12* (2013.01); H04L 2012/40215 (2013.01)

(58) Field of Classification Search
CPC ........... H04L 12/40169; H04L 12/4625; H04L 12/4633
USPC ........................................................ 370/467
See application file for complete search history.

(56) References Cited

U.S. PATENT DOCUMENTS

| 8,473,140 B2 | 6/2013 | Norris et al. |
| 9,196,100 B1* | 11/2015 | Kilworth ................ G07C 5/085 |
| 2008/0159281 A1 | 7/2008 | Jesseph |
| 2014/0108603 A1* | 4/2014 | Mohr .................... H04L 69/161 |
| | | 709/217 |
| 2014/0126584 A1* | 5/2014 | Hwang ................... H04L 69/08 |
| | | 370/466 |

FOREIGN PATENT DOCUMENTS

| EP | 1515496 A2 | 3/2005 |
| JP | 2009-135567 A | 6/2009 |
| JP | 2011-0138468 | 7/2011 |

(Continued)

OTHER PUBLICATIONS

Kern et al., "Gateway Strategies for Embedding of Automotive CAN-Frames into Ethernet-Packet and Vice Versa", M. Berekovic et al. (Eds.): ARCS 2011, LNCS 6566, p. 259-270, 2011.*

*Primary Examiner* — Faruk Hamza
*Assistant Examiner* — Saad A Waqas
(74) *Attorney, Agent, or Firm* — Mintz Levin Cohn Ferris Glovsky and Popeo, P.C.

(57) ABSTRACT

In-vehicle communication and, more particularly, a signal conversion method in a vehicle having Ethernet and controller area network (CAN) communication coexisting therein and an apparatus to perform the same are provided. The signal conversion method includes determining, by a processor, a start bit of at least one CAN signal disposed in a CAN message and generating an Ethernet signal having the CAN signal and the start bit that corresponds to the CAN signal in different fields.

17 Claims, 8 Drawing Sheets

(56) References Cited

FOREIGN PATENT DOCUMENTS

| KR | 10-2007-0082299 A | 8/2007 |
| KR | 10-2011-0046103   | 5/2011 |
| KR | 10-2011-0057371 A | 6/2011 |

\* cited by examiner

| | Channel Number | Target ID | Start Bit | Signal |
|---|---|---|---|---|
| DVD_TimeHour | - | 0x003 | 0 | DVD_TimeHour (4bits) |
| DVD_TimeMin | - | 0x003 | 8 | DVD_TimeMin (8bits) |
| | | | | |
| DVD_PbcStatus | 0 | 0x003 | 32 | DVD_PbcStatus (2bits) |

IN-VEHICLE APPARATUS FOR SIGNAL CONVERSION BETWEEN ETHERNET AND CAN COMMUNICATION AND CONTROL METHOD THEREOF

CROSS REFERENCE TO RELATED APPLICATION

This application claims the benefit of Korean Patent Application No. 10-2014-0016523, filed on Feb. 13, 2014, which is hereby incorporated by reference as if fully set forth herein.

BACKGROUND

Field of the Invention

The present invention relates to in-vehicle communication and, more particularly, to a signal conversion method within a vehicle having Ethernet and controller area network (CAN) communication coexisting therein and an apparatus to perform the signal conversion method.

Discussion of the Related Art

Generally, communication between controllers (or electronic control units (ECUs)) within a vehicle is performed in a controller area network (CAN) mode. However, CAN communication speed is relatively slow. Accordingly, commercial Ethernet has been actively used for communication between the controllers in recent years.

The communication speed may be increased through the use of such commercial Ethernet. In addition, system configuration cost may be reduced by configuring the system using substantially inexpensive parts. Furthermore, it may be possible to simply maintain a wiring and connection structure by connecting an ECU local network to one main system bus. However, vehicle communication based on the CAN communication may be continuously used in the industry and, therefore, a data conversion mechanism is necessary between the Ethernet and the CAN communication within a vehicle network having the Ethernet and the CAN communication coexisting therein.

SUMMARY

Accordingly, the present invention is directed to an in-vehicle apparatus for signal conversion between Ethernet and CAN communication and a control method thereof that substantially obviate one or more problems due to limitations and disadvantages of the related art. The present invention provides a processor configured to perform signal conversion between Ethernet and CAN communication on an in-vehicle network and a control method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the accompanying drawings.

To achieve these objects and other advantages and in accordance with the purpose of the invention, as embodied and broadly described herein, a signal conversion method between controller area network (CAN) communication and Ethernet may include determining a start bit of at least one CAN signal provided in a CAN message and generating an Ethernet signal having the CAN signal and the start bit corresponding to the CAN signal in different fields. Further, a signal conversion method between CAN communication and Ethernet may include acquiring an Ethernet signal having a start bit field and a signal field corresponding to at least one CAN signal and arranging a signal provided in the signal field at a position indicated by the start bit field corresponding thereto to generate a CAN message.

In another aspect of the present invention, a processor configured to perform signal conversion between CAN communication and Ethernet may include a CAN processing module configured to determine a start bit of at least one CAN signal provided in a CAN message and generate an Ethernet signal having the CAN signal and the start bit corresponding to the CAN signal in different fields. In addition, the processor configured to perform signal conversion between CAN communication and Ethernet may include a CAN processing module configured to acquire an Ethernet signal having a start bit field and a signal field corresponding to at least one CAN signal and arrange a signal provided in the signal field at a position indicated by the start bit field corresponding thereto to generate a CAN message.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. The suffixes "module" and "unit" of elements herein are used for convenience of description and thus may be used interchangeably and do not have any distinguishable meanings or functions.

The reason for signal conversion between CAN communication and Ethernet will be first described before a signal conversion method between a CAN and Ethernet according to the present invention is described. For Ethernet, vehicle communication speed may be generally fixed to about 100 Mbps or 1 Gbps and the maximum frame size of about 1518 bytes. Further, CAN communication may have a speed of about 100 kpbs to 500 kbps and may include an 11-bit ID region and an 8-byte data region. In addition, CAN data may have 104 bits and a CAN message may include a plurality of signals. A data link region may be provided to map a plurality of signals into one message.

Figure 1:
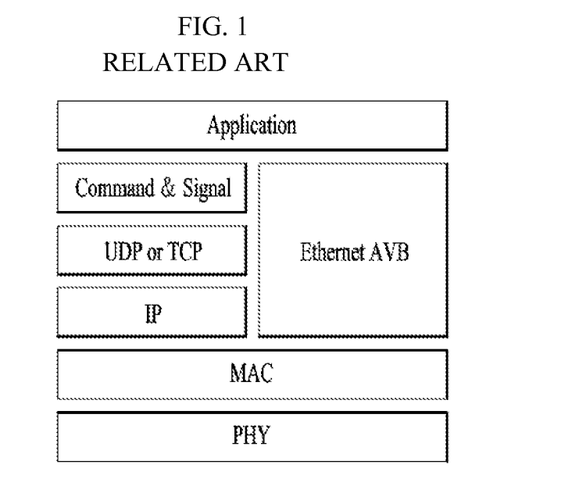
FIG. 1 is an exemplary view of a general in-vehicle protocol configuration according to the related art.
Figure 2A:
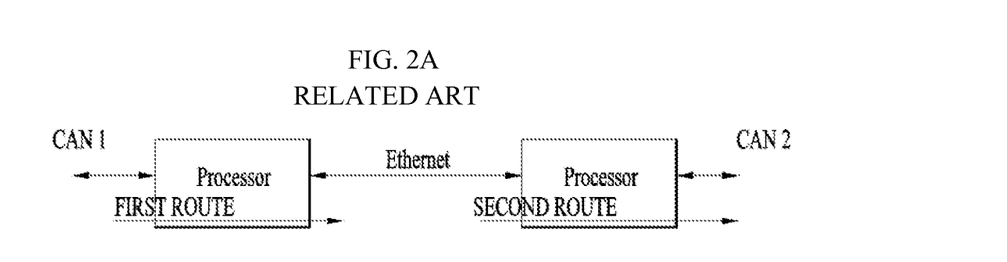
FIGS. 2A-2B is an exemplary view of a network configuration in which two CAN networks are connected to each other through Ethernet according to the related art.
Figure 2B:
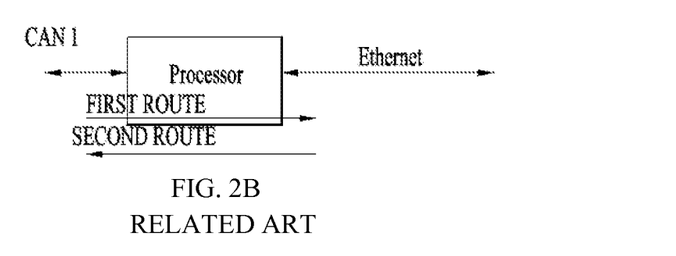

Furthermore, the Ethernet and the CAN communication may have different message processing units in a protocol stack, which will be described with reference to FIG. 1. In a protocol stack of an in-vehicle Ethernet shown in FIG. 1, a command and signal part, not an Ethernet AVB, may be in charge of (e.g., may control) a CAN message. In other words, the CAN message may be non-AVB communication using an Internet protocol (IP). A problem caused when two modes having different frame structures, speeds, message processing units on the protocol stack as described above coexist in a vehicle will be described with reference to FIG. 2.

Figure 3:
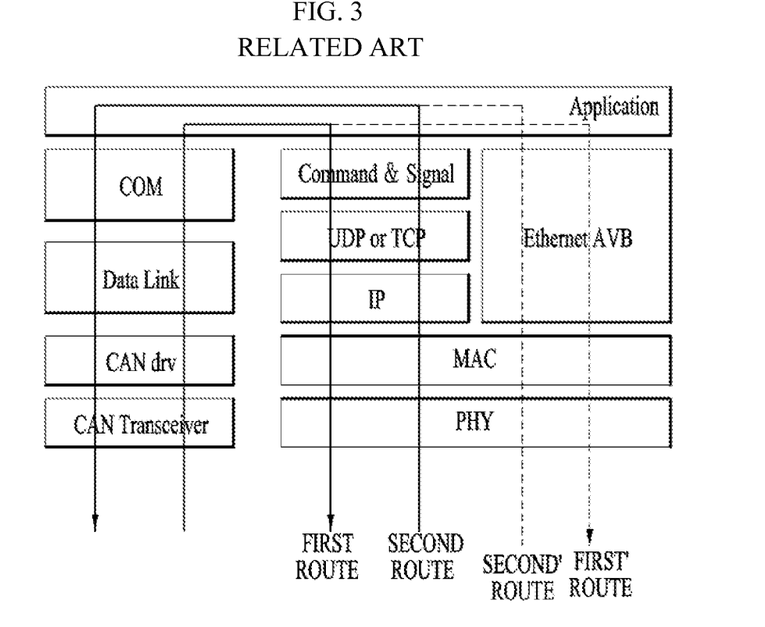
FIG. 3 is an exemplary view of a protocol stack structure of a processor configured to perform data format conversion between a CAN network and the Ethernet network and a data conversion process thereof according to the related art.

FIGS. 2A-2B are exemplary views of a network configuration in which two CAN networks are connected to each other through Ethernet. In FIGS. 2A-2B, it may be assumed that, when a type of the network is changed, a process of converting a data format to be suitable for each network may be performed by a processor. A general processor may be configured to convert a data format according to any one of the CAN and Ethernet networks into a data format according to the other (e.g., may be configured to convert the data format based on the type of communication network). The processor may have a protocol stack structure as shown in FIG. 3.

Referring to FIG. 2A, when CAN data is transmitted from CAN 1 to CAN 2 via the Ethernet, data format conversion may be performed twice, i.e. from CAN to Ethernet and from Ethernet to CAN. Accordingly, the processor may be configured to perform data format conversion suitable for each communication protocol using minimum hardware/software resources within the minimum time allowing the network to operate more efficiently. In addition, substantially low-speed small data may be connected to a substantially high-speed big data frame via a first route. Further, substantially high-speed big data may be stored in a substantially low-speed small data frame via the second route causing a potential problem.

The potential problem discussed above may be caused depending upon a direction between the Ethernet and the CAN network in the same processor as shown in FIG. 2B. In other words, substantially low-speed small data may be connected to a substantially high-speed big data frame via a first route, thus preventing any potential problems as discussed above. Further, a substantially high-speed big data may be stored in a substantially low-speed small data frame via a second route causing the potential problem discussed above.

The data routes described with reference to FIGS. 2A-2B will be described through a protocol stack with reference to FIG. 3. FIG. 3 is an exemplary view of a protocol stack structure of a processor configured to perform data format conversion between a CAN network and the Ethernet network and a data conversion process thereof.

Referring to FIG. 3, the protocol stack of the processor may include a protocol stack (left side) of the CAN network and a protocol stack (right side) of the Ethernet. In addition, the uppermost application layer may be shared. In the first route of FIG. 2B, (i.e. a process of changing CAN data into a data format according to the Ethernet) CAN data received from a CAN transceiver layer may be decapsulated while moving upward to upper layers to transmit data intended to transmit from a source generating the CAN data to a destination to the application layer. The transmitted data may be converted into an Ethernet frame according to an encapsulation process based on the Ethernet protocol and transmitted to the Ethernet network via a physical layer. In a second route, conversion may be performed in an opposite order to the first route. Meanwhile, in FIG. 3, it may be assumed that the CAN data is converted into the Ethernet frame via the IP layer during the frame conversion process. However, the present invention is not limited thereto. Of course, conversion via Ethernet AVB (i.e. a first' route and a second' route) instead of the IP layer may be possible.

The frame conversion process between the CAN and the Ethernet as described above has the following problems. The entirety of the CAN message may be included in a payload of the Ethernet frame since the Ethernet may have a greater frame structure than the CAN as previously described. However, a message may not be duplicated from CAN 1 network to CAN 2 network as it is. When an Ethernet frame including the CAN message is converted into a CAN frame, a data division/mapping problem may be caused during conversion from a substantially large data frame to a substantially small data frame. In addition, passing through the uppermost application layer may be performed during every conversion. As a result, speed of the conversion may be decreased.

Figure 4A:
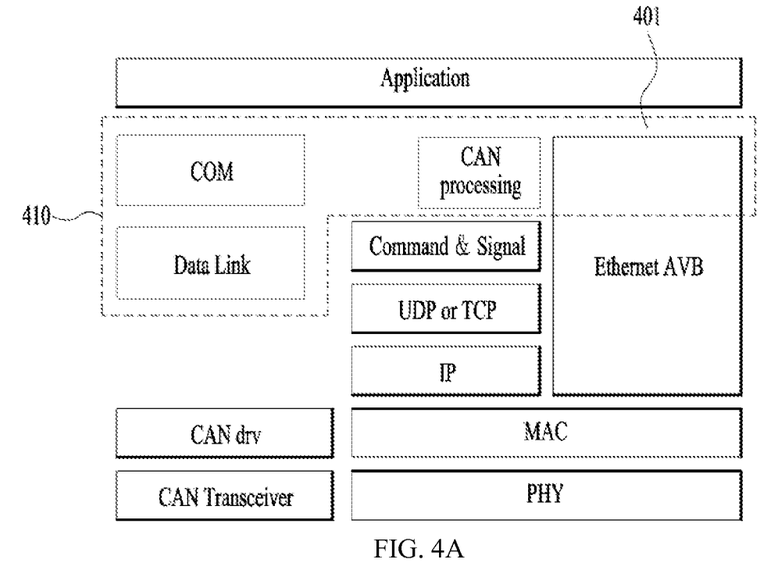
FIGS. 4A-4B are exemplary views of a protocol stack structure of a processor according to an exemplary embodiment of the present invention.
Figure 4B:
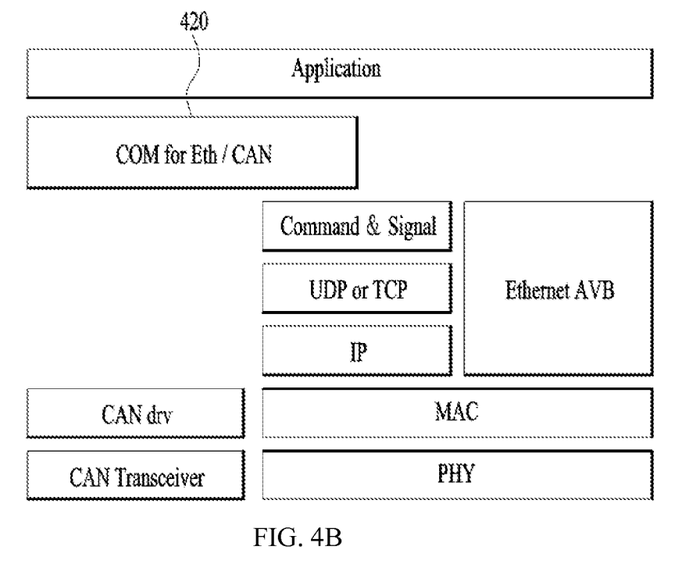

Consequently, an exemplary embodiment of the present invention proposes a protocol stack structure of a new processor having a reduced conversion time using reduced hardware/software resources and a format of an Ethernet signal related to CAN data which will be applied thereto. Specifically, the processor according to the present invention may include a CAN processing layer to perform a format conversion process disposed below the application layer and data format conversion may be performed therethrough, which will be described with reference to FIG. 4.

FIGS. 4A-4B are exemplary views of a protocol stack structure of a processor according to an exemplary embodiment of the present invention. Referring to FIG. 4A, the protocol stack of the processor may include a CAN processing layer 401 disposed below the application layer. Additionally, when the CAN processing layer and a COM/date link layer are embodied as a single conversion processing unit 410, a CAN/Ethernet conversion COM layer 420 may be provided as shown in FIG. 4B.

Figure 5:
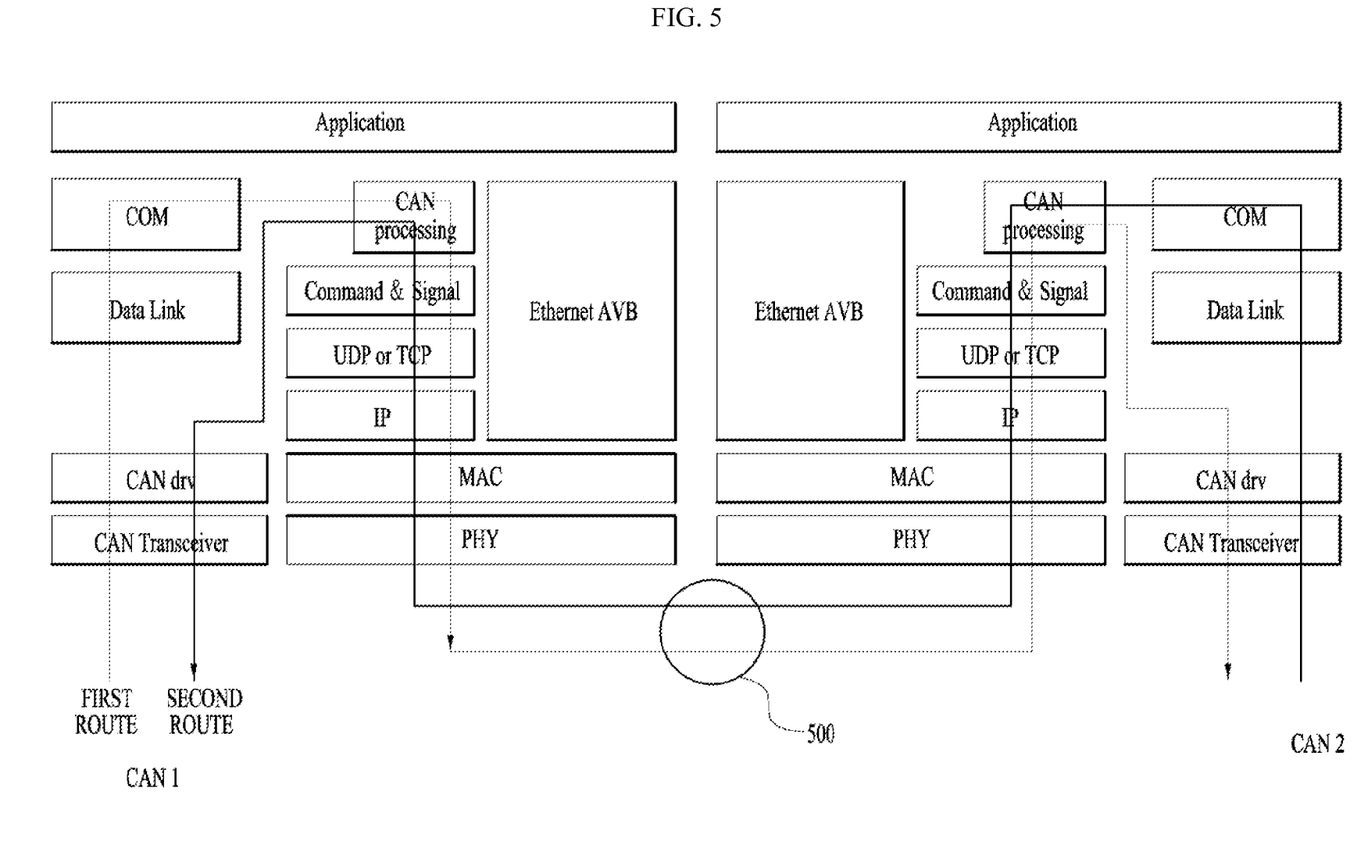
FIG. 5 is an exemplary view of a data format conversion process according to an exemplary embodiment of the present invention in a network environment in which two CAN networks are connected to each other through Ethernet.

When the structure as shown in FIGS. 4A-4B is applied, the data format conversion process in the network configuration as shown in FIG. 2A may be performed as shown in FIG. 5. FIG. 5 is an exemplary view of a data format conversion process according to an exemplary embodiment of the present invention in a network environment in which two CAN networks may be connected to each other via Ethernet.

Referring to FIG. 5, the protocol stack of the processor to the COM layer of the stack corresponding to the CAN in a first route are similar to in FIG. 3. Subsequently, however, passing through the CAN processing layer, not the application layer, may be performed. Further, the protocol stack of the processor to the command and signal layer of the stack corresponding to the Ethernet in a second route are similar to those in FIG. 3. Subsequently, however, passing through the CAN processing layer, not the application layer, may be performed. The CAN data converted through the CAN processing layer may be directly transmitted to the CAN driver layer, not via the COM layer and the data link layer, according to the exemplary embodiments.

To improve conversion efficiency of the CAN processing layer (e.g., to increase speed and reduce hardware/software requirements), the structure of an Ethernet signal format related to CAN data which will be used in the Ethernet network 500 may be considered. Accordingly, the present invention proposes that the CAN message may be divided into signal units constituting the CAN message and converted into Ethernet signals. In addition, the present invention proposes that a bit number indicating a position where each signal is disposed in the original CAN message may be used to restore the divided signals into the CAN message, which will be described with reference to FIG. 6.

Figure 6:
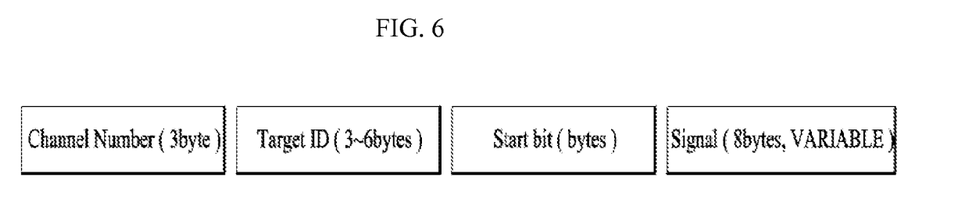
FIG. 6 is an exemplary view of an Ethernet signal format according to an exemplary embodiment of the present invention.

FIG. 6 is an exemplary view of an Ethernet signal format according to an exemplary embodiment of the present invention. Referring to FIG. 6, the Ethernet signal format related to the CAN may include a channel number field, a target identification (ID) field, a start bit field, and a signal field that corresponds to each signal of the CAN message. In other words, one CAN signal may be converted into an Ethernet signal using a maximum of four fields for restoration. The respective fields will be described.

The channel number field may be a target channel selected from among a plurality of (hardware) CAN channels owned by the processor. This field may be omitted based on network configuration. The target ID field may be an identification (ID) of the mapped CAN message and may have about 11 bits for a standard format and about 29 bits for an extended format. The start bit field may be mapping information that indicates a start position of a signal in the CAN message when the signal is mapped to the CAN message. The signal field may correspond to a CAN signal. In summary, a target channel and message ID to which the CAN message may be transmitted may be specified through the channel number field and the target ID field to constitute a CAN header. A signal included in the signal field may be disposed from a bit indicated by the start bit field in the CAN message to constitute the CAN message. Consequently, the Ethernet signal may be efficiently converted into the CAN message.

Figure 7:
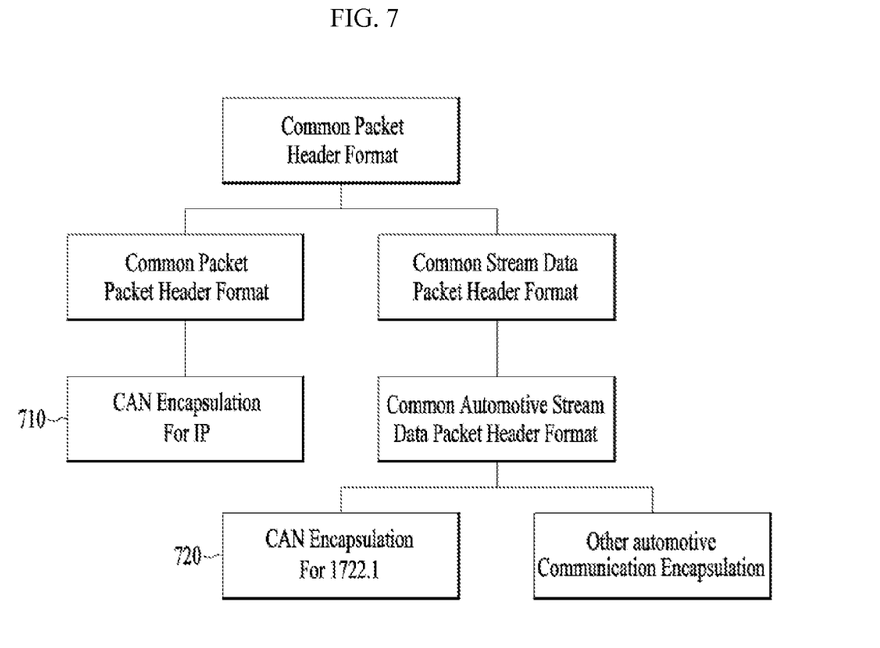
FIG. 7 is an exemplary view of a header format of a packet in which the Ethernet signal format according to the exemplary embodiment of the present invention is used.

Hereinafter, an application example in which the Ethernet signal format as described above is used will be described. FIG. 7 is an exemplary view of a packet in which the Ethernet signal format according to the exemplary embodiment of the present invention is used.

Referring to FIG. 7, a header format of a common packet of the Ethernet may be mainly divided into a packet header format of the common packet and a packet header format of common stream data. The packet header format of the common packet may be used for encapsulation (710) of CAN data through the Internet protocol. The packet header format of the common stream data may be used for encapsulation (720) of CAN data based on IEEE 1722.1 standards.

Figure 8:
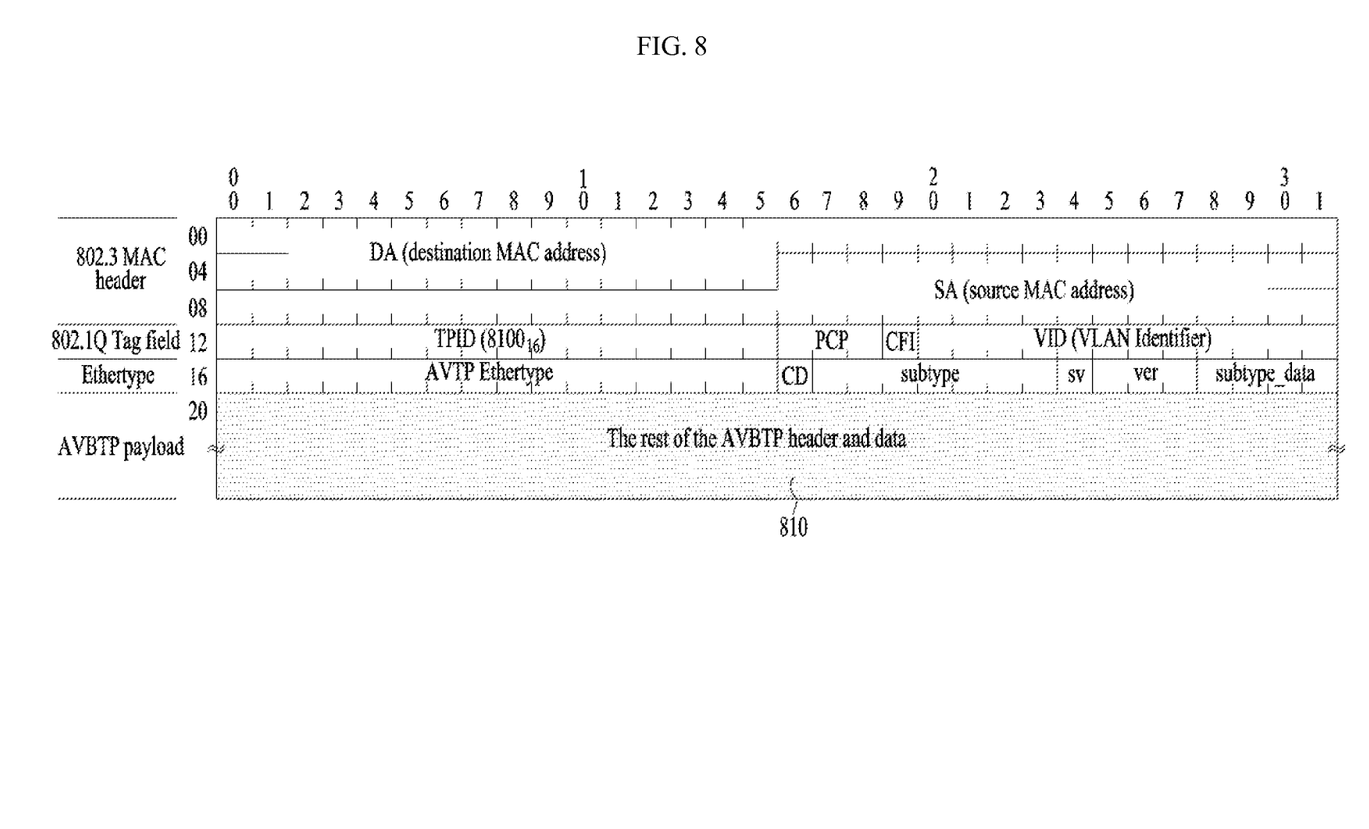
FIG. 8 is an exemplary view of a frame structure based on IEEE 1722.1 standards to which the Ethernet signal format according to the exemplary embodiment of the present invention may be applied.
Figure 9:
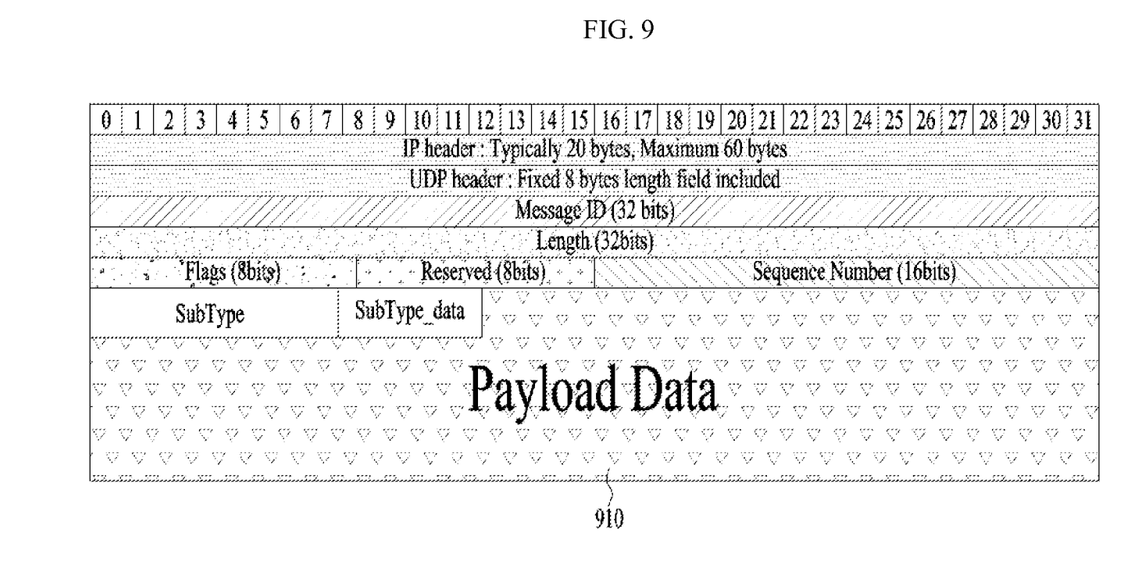
FIG. 9 is an exemplary view of a frame structure based on an Internet protocol to which the Ethernet signal format according to the exemplary embodiment of the present invention may be applied.

An application example of encapsulation based on each mode will be described with reference to FIGS. 8 and 9. A frame structure as shown in FIG. 8 may be used for encapsulation of CAN data based on IEEE 1722.1 standards. A MAC header based on IEEE 802.3 standards may be used as the header. Each field constituting the Ethernet signal format may be included in a payload 810. Each field constituting the header is specified in IEEE 1722.1 standards and IEEE 802.3 standards, which shows an example of the frame structure based on IEEE 1722.1 standards, to which the Ethernet signal format may be applied. A frame structure as shown in FIG. 9 may be used for encapsulation of CAN data based on the Internet protocol. Even for a frame using an IP header, each field constituting the Ethernet signal format may be included in a payload 910. Accordingly, a subtype field and a subtype data field may be further included in the payload. The subtype field may define a protocol type and may include type specific data.

Figure 10A:
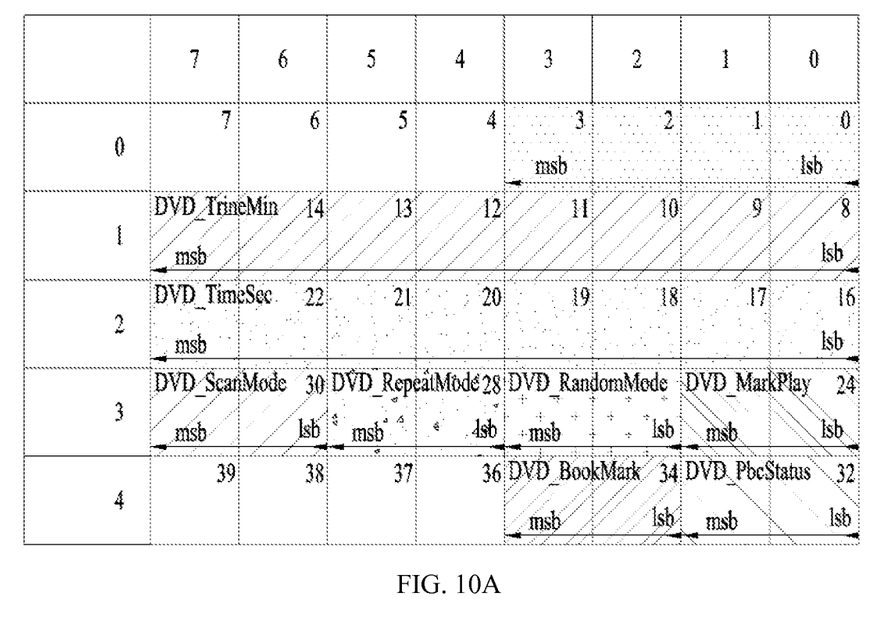
FIGS. 10A-10B are exemplary views of conversion of a CAN signal into an Ethernet signal according to an exemplary embodiment of the present invention.
Figure 10B:
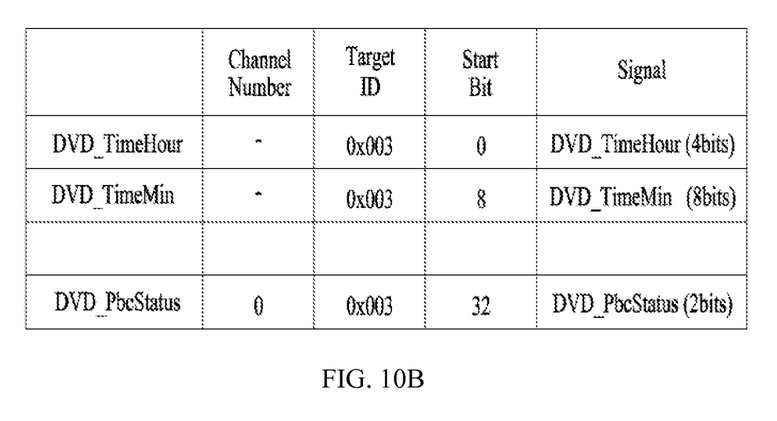

Hereinafter, an example of conversion of each signal constituting a CAN message into an Ethernet signal according to an exemplary embodiment the present invention will be described with reference to FIGS. 10A-10B. FIGS. 10A-10B are exemplary views of conversion of a CAN signal into an Ethernet signal according to an exemplary embodiment of the present invention. In FIGS. 10A-10B, it may be assumed that each signal included in a CAN message is directed to a target channel (number 0) and message ID is 3.

In FIG. 10A, a format of a CAN message is shown that may include nine CAN signals having a total size of 36 bits. When this CAN message is converted into an Ethernet signal, the CAN message may be converted into a channel number field, a target ID field, a start bit field, and a signal field per signal as shown in FIG. 10B. For example, a DVD-TimeHour signal may be disposed from the first bit in the CAN message and thus a start bit field may be 0. A DVD-TimeMin signal may be disposed from the ninth bit in the CAN message and thus a start bit field may be 8. When the signal format shown in FIG. 10B is converted into the CAN message, the respective signals may be sequentially disposed at positions indicated by the start bit field to restore the CAN message. In particular, the format conversion method as described above may be performed as follows.

First, the processor configured to perform format conversion may be configured to receive a CAN frame from the CAN network. The received CAN frame may be transmitted to the upper layer of the CAN protocol stack to decapsulate the CAN frame to acquire a CAN message that includes at least one CAN signal. The CAN processing layer may be configured to determine a start bit of the at least one CAN signal included in the CAN message and generate an Ethernet signal that include the CAN signal and the start bit that corresponds to the CAN signal in different fields. The generated Ethernet signal may be transmitted to the lower layer of the Ethernet protocol stack to encapsulate the Ethernet signal to generate an Ethernet frame. The generated Ethernet frame may be transmitted to an Ethernet network. The Ethernet transmitted as described above may be converted into a CAN frame through reverse processes.

It may be possible to more efficiently perform data format conversion between CAN and Ethernet using the protocol stack structure of the processor as described above and the Ethernet signal format for the same. In the protocol stack structure, each layer may be embodied by one or more modules or a plurality of layers may be embodied as one module. For example, the COM layer, the data link layer, and the CAN processing layer of FIGS. 4A-4B may be embodied as three different modules, as a CAN/Ethernet conversion COM layer through one module, or as two modules.

As is apparent from the above description, it may be possible to more efficiently perform data exchange between CAN and Ethernet using a controller according to at least one exemplary embodiment of the present invention as described above. It will be appreciated by persons skilled in the art that the effects that may be achieved through the present invention are not limited to what has been particularly described hereinabove and other advantages of the present invention will be more clearly understood from the above detailed description. It will also be apparent to those skilled in the art that various modifications and variations may be made in the present invention without departing from the spirit or scope of the inventions. Thus, it is intended that the present invention covers the modifications and variations of this invention provided they come within the scope of the accompanying claims and their equivalents.

What is claimed is:

1. A signal conversion method between controller area network (CAN) communication and Ethernet, comprising:
   determining, by a processor, a plurality of start bits corresponding to each of a plurality of CAN signals disposed in an original CAN message of a CAN frame; and
   generating, by the processor, an Ethernet signal of an Ethernet frame that includes the plurality of CAN signals and the plurality of start bits that corresponds to each of the plurality of CAN signals in different fields,
   wherein each of the plurality of start bits indicates a start position of a corresponding CAN signal among the plurality of CAN signals in the original CAN message when the corresponding CAN signal is mapped to the original CAN message,
   wherein the Ethernet signal further includes a field that corresponds to an identification (ID) of the original CAN message and a field that indicates a target channel of the original CAN message, and
   wherein the field that corresponds to the ID of the original CAN message and the field that indicates the target channel of the original CAN message are disposed in the Ethernet signal per each of the plurality of CAN signals.

2. The signal conversion method according to claim 1, further comprising:
   receiving, by the processor, a CAN frame from a CAN network;
   decapsulating, by the processor, the CAN frame to acquire the original CAN message;
   encapsulating, by the processor, the Ethernet signal to generate an Ethernet frame; and
   transmitting, by the processor, the generated Ethernet frame to an Ethernet network.

3. The signal conversion method according to claim 1, wherein the determining and the generating are performed by a CAN processing layer disposed below an application layer.

4. The signal conversion method according to claim 2, wherein the Ethernet signal is disposed in a payload of the Ethernet frame.

5. A signal conversion method between controller area network (CAN) communication and Ethernet, comprising:
   acquiring, by a processor, an Ethernet signal of an Ethernet frame that includes a plurality of start bit fields and a plurality of signal fields, each of the plurality of start bit fields and the plurality of signal fields corresponding to one of a plurality of CAN signals; and
   arranging, by the processor, each of the plurality of CAN signals disposed in the plurality of signal fields at a position indicated by a corresponding one of the plurality of start bit fields to generate a CAN message of a CAN frame,
   wherein each of the at plurality of start bit fields indicates a start position of a corresponding CAN signal among the plurality of CAN signals in an original CAN message when the corresponding CAN signal is mapped to the original CAN message, wherein the Ethernet signal further includes a field that corresponds to an identification (ID) of the CAN message and a field that indicates a target channel of the CAN message, and wherein the field that corresponds to the ID of the CAN message and the field that indicates the target channel of the CAN message are disposed in the Ethernet signal per each of the plurality of CAN signals.

6. The signal conversion method according to claim 5, further comprising:

receiving, by the processor, an Ethernet frame from an Ethernet network;

decapsulating, by the processor, the Ethernet frame;

encapsulating, by the processor, the original CAN message to generate a CAN frame; and transmitting, by the processor, the generated CAN frame to a CAN network.

7. The signal conversion method according to claim 5, wherein the generation of the CAN message is performed by a CAN processing layer disposed below an application layer.

8. The signal conversion method according to claim 6, wherein the Ethernet signal is disposed in a payload of the Ethernet frame.

9. A signal conversion system, comprising:

a memory configured to store program instructions; and a processor configured to execute the stored program instructions, which when executed cause the processor to perform signal conversion between controller area network (CAN) communication and Ethernet, to determine a plurality of start bits corresponding to each of a plurality of CAN signals disposed in an original CAN message of a CAN frame, and to generate an Ethernet signal of an Ethernet frame that includes the plurality of CAN signals and the plurality of start bits that corresponds to each of the plurality of CAN signals in different fields, wherein each of the plurality of start bits indicates a start position of a corresponding CAN signal among the plurality of CAN signals in the original CAN message when the corresponding CAN signal is mapped to the original CAN message, wherein the Ethernet signal further includes a field that corresponds to an identification (ID) of the original CAN message and a field that indicates a target channel of the original CAN message, and wherein the field that corresponds to the ID of the original CAN message and the field that indicates the target channel of the original CAN message are disposed in the Ethernet signal per each of the plurality of CAN signals.

10. The system according to claim 9, further comprising:

a CAN module configured to receive a CAN frame from a CAN network and to decapsulate the CAN frame to acquire the original CAN message; and an Ethernet module configured to encapsulate the Ethernet signal to generate an Ethernet frame and to transmit the generated Ethernet frame to an Ethernet network.

11. The system according to claim 9, wherein the CAN processing module is disposed below an application layer of a protocol stack.

12. The system according to claim 10, wherein the Ethernet signal is disposed in a payload of the Ethernet frame.

13. A signal conversion system, comprising:

a memory configured to store program instructions; and a processor configured to execute the stored program instructions, which when executed cause the processor to perform signal conversion between controller area network (CAN) communication and Ethernet, to acquire an Ethernet signal of an Ethernet frame that includes a plurality of start bit fields and a plurality of signal fields, each of the plurality of start bit fields and the plurality of signal fields corresponding to a plurality of CAN signals, and to arrange each of the plurality of CAN signals disposed in the plurality of signal fields at a position indicated by a corresponding one of the plurality of start bit fields to generate a CAN message of a CAN frame, wherein each of the plurality of start bit fields indicates a start position of a corresponding CAN signal among the plurality of CAN signals in an original CAN message when the corresponding CAN signal is mapped to the original CAN message, wherein the Ethernet signal further includes a field that corresponds to an identification (ID) of the CAN message and a field that indicates a target channel of the CAN message, and wherein the field that corresponds to the ID of the CAN message and the field that indicates the target channel of the CAN message are disposed in the Ethernet signal per each of the plurality of CAN signals.

14. The system according to claim 13, further comprising:

an Ethernet module configured to receive an Ethernet frame from an Ethernet network and to decapsulate the Ethernet frame; and a CAN module configured to encapsulate the original CAN message to generate a CAN frame and to transmit the generated CAN frame to a CAN network.

15. The system according to claim 13, wherein the CAN processing module is disposed below an application layer of a protocol stack.

16. The system according to claim 14, wherein the Ethernet signal is disposed in a payload of the Ethernet frame.

17. A non-transitory computer readable medium containing program instructions executed by a processor, the computer readable medium comprising:

program instructions that acquire an Ethernet signal of an Ethernet frame that includes a plurality of start bit fields and a plurality of signal fields, each of the plurality of start bit fields and the plurality of signal fields corresponding to one of a plurality of controller area network (CAN) signals; and program instructions that arrange each of the plurality of CAN signals disposed in the plurality of signal fields at a position indicated by a corresponding one of the plurality of start bit fields to generate a CAN message of a CAN frame, wherein each of the plurality of start bit fields indicates a start position of a corresponding CAN signal among the plurality of CAN signals in an original CAN message when the corresponding CAN signal is mapped to the original CAN message, wherein the Ethernet signal further includes a field that corresponds to an identification (ID) of the CAN message and a field that indicates a target channel of the CAN message, and wherein the field that corresponds to the ID of the CAN message and the field that indicates the target channel of the CAN message are disposed in the Ethernet signal per each of the plurality of CAN signals.

* * * * *